May 10, 1966 A. J. DE VRIES ETAL 3,250,857

STEREO FM RECEIVER

Filed Oct. 27, 1961 2 Sheets-Sheet 1

INVENTORS
Adrian J. De Vries
Fleming Dias
By Francis W. Crotty
Atty.

STEREO FM RECEIVER

Filed Oct. 27, 1961 2 Sheets-Sheet 2

INVENTORS
Adrian J. De Vries
Fleming Dias
By Francis W. Crotty
Atty.

3,250,857
STEREO FM RECEIVER
Adrian J. De Vries, Elmhurst, and Fleming Dias, Chicago, Ill., assignors to Zenith Radio Corporation, a corporation of Delaware
Filed Oct. 27, 1961, Ser. No. 148,234
12 Claims. (Cl. 179—15)

Figures 1, 4, 5:
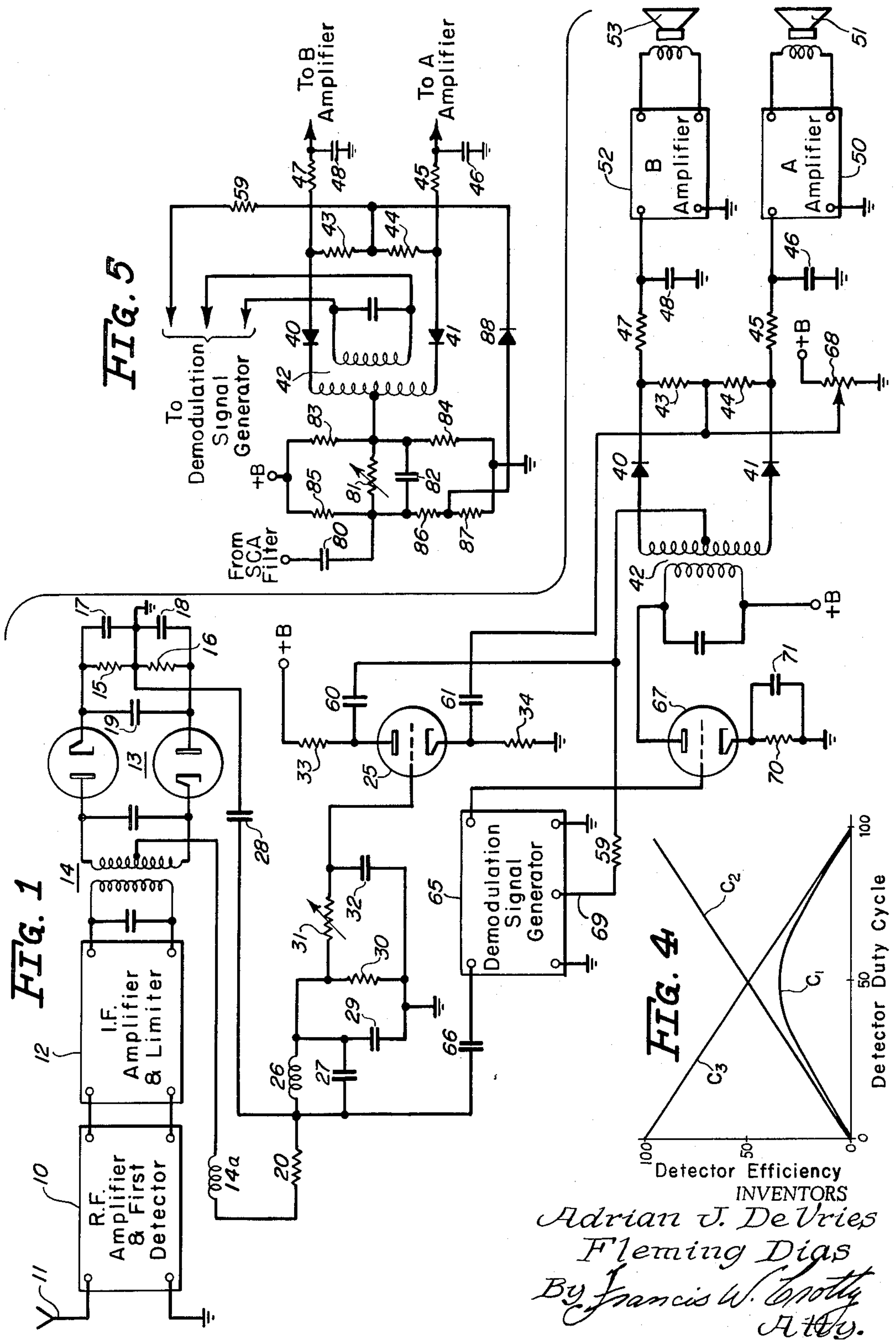

The present invention is directed generally to a multi-mode broadcast receiving system, that is to say, a system which in one mode receives and reproduces monaural broadcast programs while in another mode it receives and utilizes stereophonic broadcast programs. More particularly, the invention addresses itself to a system of that type wherein the program is transmitted by means of frequency modulation of a carrier signal.

Very recently the Federal Communications Commission adopted standards for the transmission of stereophonic programs by means of frequency modulation. The standards contemplate the complex modulation of a carrier signal. The first modulation component of the carrier is referred to as the sum signal and is merely the addition of the two signal components characteristically utilized in stereophonic transmission. They are popularly referred to as the right and left channel signals but in this text have the more general designation of the A and B audio signals. The other principal modulation component is a subcarrier which is suppressed-carrier amplitude-modulated with the difference of the A and B audio signals. Since suppressed-carrier modulation is specified, a third modulation component is provided to serve as a pilot for synchronizing the receiver.

These three identified components are employed as the complex modulation of a frequency modulated carrier having a modulation function defined by the following expression:

$$M(t)=K_1(A+B)+K_2(A-B)S+K_3S' \qquad (1)$$

where A and B are the audio signals, as explained, S is the suppressed-carrier amplitude-modulated subcarrier signal, S' is the pilot, and $K_1$ through $K_3$ are constants of which $K_1$ and $K_2$ are preferably equal.

Such a stereophonic system is described and claimed in application Serial No. 22,926, filed April 18, 1960, in the name of Robert Adler et al. and assigned to the present assignee. As explained in that application, if the suppressed-carrier amplitude-modulated subcarrier is dedeveloped by the use of multiplex techniques or by a modulator controlled by a switching signal of essentially 50 percent duty cycle, modulation components are developed not only at the subcarrier frequency but also in association with several of its harmonics. However, only the side bands or modulation components incident to the subcarrier frequency need be employed and it will be assumed that such is the type of transmission utilized by the receiver to be described herein.

An attractive receiver for responding to such a stereophonic broadcast is the subject of application Serial No. 118,009, filed June 19, 1961, in the name of DeVries and likewise assigned to the assignee of the present invention. The DeVries receiver may be characterized as a multimode instrument in that it may utilize a monaural frequency modulation broadcast or a stereophonic frequency modulation broadcast conforming to specifications of the Commission and adjusting itself automatically as to operating mode in accordance with the nature of the received signal. Although that receiver does have the attractive attribute of automatically adjusting itself as between monaural and stereophonic reproduction, it has been found that the output level is not the same for both modes of operation. While that is no great disadvantage, it is desirable to maintain the output level constant irrespective of the operating mode and this improvement is accomplished by the receiving system of the subject invention.

Accordingly, a principal object of the invention is to provide a new apparatus and method for the reception of monaural and stereophonic frequency modulation broadcasts.

A specific object of the invention is to provide a method and means for responding to monaural or stereophonic frequency modulation broadcasts while maintaining the level of reproduction substantially constant irrespective of the character of the received signal.

Another specific object of the invention is the provision of a new detector for use in a stereophonic frequency modulation broadcast receiver.

Still another object of the invention is to provide apparatus for the reception of monaural and/or stereophonic broadcasts characterized by improved freedom from interference attributable to other services, such as store casting, which may be concurrently served by the transmission without adversely affecting the desired signal reproduction.

A receiver, embodying the invention, for using a monaural or stereophonic frequency modulation broadcast comprises means for demodulating the received frequency modulated carrier to derive a detected signal representing the modulation function of that carrier. There are additional means for applying the detected signal to a second demodulator which is arranged to translate the audio signal without detection during monaural operation but which derives separated A and B audio signals during stereophonic reception. Finally, there are means for effectively adjusting the intensity of the signals applied to the second demodulator, making the adjustment in response to a change between monaural and stereophonic reproduction to maintain the level of reproduction approximately constant.

In one aspect of the method concept of the invention, the signals translated by the receiver in monaural and stereophonic reproduction are relatively weighted or adjusted in intensity automatically in order to maintain a substantially constant level of signal reproduction. More specifically, the adjustment in intensity may be accomplished by varying the amplitude of the subcarrier component as it is supplied from the carrier signal demodulator to the second demodulator wherein the subcarrier is demodulated in extracting separated A and B audio signals. A similar result may be attained by modifying the detector efficiency of the subcarrier detector or by varying the phase of the demodulation signal delivered to the second demodulator, assuming that demodulator to be of the synchronous type. Accordingly, the expression "effectively adjusting the intensity" is used to include these several types of operation as will be apparent from the detailed description.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 1 is a schematic representation of a multimode frequency modulation receiver constructed in accordance with the invention;

FIGURES 2*a*, 2*b*, 3*a* and 3*b* are functional diagrams used in explaining the operation of the receiver and its distinction over a prior but similar receiver;

FIGURE 4 is a set of curves utilized in explaining the practice of equalizing the output level by adjustment of detector efficiency; and FIGURE 5 shows another detector arrangement for practicing the invention.

Aside from the method concept of maintaining the output level constant as the operating mode shifts between monaural and stereophonic and further aside from the apparatus concepts relied on to achieve that result, the receiver of FIGURE 1 is essentially the same as that described and claimed in the above-identified DeVries application. Structurally, the arrangement comprises receiving circuits which at least through the first signal detector are conventional. They include a radio-frequency amplifier of any desired number of stages and a heterodyning stage both of which are represented by block 10. The input of the amplifying portion connects with a wave signal antenna 11. The output of block 10 connects with a unit 12 which will be understood to include any desired number of stages of intermediate-frequency amplification and one or more amplitude limiters. As stated, these elements are of generally well-known construction.

It is to be pointed out, however, that the receiver should have characteristics superior to those normally found in conventional monophonic FM receivers. It is preferable, for example, that the sensitivity be high so that the signal-to-noise ratio, particularly on stereophonic reception, will be acceptable in fringe areas. Automatic gain control for the IF and RF stages and automatic frequency control for the heterodyne oscillator or unit 10 are desirable and may be considered to have been included in the blocks shown. The intermediate-frequency bandwidth of the usual monaural FM receiver is 150 to 180 kc. wide at the —6 decibel point but the bandwidth of the receiver under consideration should be wider to prevent inter-modulation or cross-talk. Since the FM transmission may simultaneously include other services, such as background music or storecasting, a bandwidth of 230 kc. is adequate if the gain control maintains the level of signal through the RF and IF amplifiers at a substantially constant value in spite of variations in intensity of the received signal.

Following IF amplifier and limiter 12 is a frequency modulation detector 13 which constitutes means for demodulating the received carrier signal to derive a detected signal representing the modulation function of the received carrier. This detector responds to the amplitude-limited intermediate-frequency signal of the receiver and since effective amplitude limiting is highly desirable it is convenient that unit 13 be a ratio detector which exhibits limiting properties and enhances the limiting of the receiver. Detector 13 is coupled to unit 12 through a double tuned transformer 14 which is selective to the intermediate-frequency of the receiver.

The detector has the usual pair of diodes connected with opposed polarities to opposite ends of the transformer secondary. Coupled on the output sides of the detectors are load resistors 15, 16 and capacitors 17, 18 connected in parallel therewith. The common terminals of these resistors and capacitors are connected to ground as shown and a large condenser 19 is arranged in parallel with the load network to cause the detector to have the desired amplitude limiting effect. Winding **14*a* introduces the quadrature voltage component to the detector and has one terminal connected to a tap of the secondary winding of the coupling transformer while its other terminal is connected to one side of a resistor 20. The other side of this resistor is connected to ground through a capacitor 28**.

Two output signals are taken from the ratio detector; one for driving the signal channel and the other for developing the necessary demodulation signal from the pilot component of the carrier during stereophonic reception. Accordingly, the receiver has one means for applying the detected signal to a second demodulator which translates audio without detection during monophonic operation but which derives cleanly separated A and B audio signals during stereophonic reception. A synchronous diode detector is a satisfactory demodulator to employ, although, as explained in the above-identified DeVries application, there may be a requirement for matrixing in that the A channel may make an unwanted and small contribution of signal into the B channel and vice versa. Matrixing is resorted to in order to eliminate this unwanted contribution in the A and B channels and a convenient way to matrix is through the use of counterphased signals. Consequently, the receiver has means for deriving a pair of counterphased signals individually representing the output of the first signal detector 13.

As shown, this means includes an amplifier 25 which is coupled to detector 13 through a filter and attenuating network. The filter permits rejection of the storecasting signal that may be simultaneously transmitted along with the stereophonic signal and it is made up of an inductor 26 shunted by a capacitor 27. Opposite terminals of the inductor are connected to ground by shunt capacitors 28, 29 and the filter is terminated in a resistor 30. Capacitors 28, 29 are small and do not serve as by-passes at the audio or pilot frequencies. One end of the filter connects to detector 13 at resistor 20 and the other end connects with the input electrodes of amplifier 25 through an attenuating network of a variable series resistor 31 and a shunt capacitor 32. The purpose of the attenuator will be made clear hereafter. The amplifier has a balanced output circuit and here the expression "balanced output" is used in the sense that there is an anode load impedance 33 and a cathode load impedance 34 which, of course, derive replicas of the applied signal but in opposite phase even though they may not be of equal magnitude. A desired ratio is established for these counterphased signals in accordance with the selection of load impedances 33 and 34.

The synchronous detector to which the counterphased signals are to be applied includes a pair of diodes 40 and 41 having anodes connected to opposite ends of an input circuit shown as the secondary of a coupling transformer 42. The output circuit of the diodes is shown as a pair of load resistors 43, 44 which are series connected between the cathodes of the diodes. An output signal is obtained from these load resistors through the usual de-emphasis networks. The network for the A audio channel comprises a series resistor 45 and a shunt capacitor 46. The de-emphasis network for the B channel likewise comprises a series resistor 47 and a shunt capacitor 48. These channels are completed by an A audio signal amplifier 50 which drives a loudspeaker 51 and a B audio amplifier 52 associated with a B speaker 53. The speakers are arranged spatially as required to establish a stereophonic sound pattern in the area to be served as is well understood in the art.

A signal representing the modulation function of the received carrier is obtained with one polarity at anode impedance 33 of amplifier 25 and is applied by way of a coupling condenser 60 and a tap on the input circuit to the anodes of the synchronous diodes and thus is applied to the diodes themselves in push-push relation. The counterphased signal obtained from cathode impedance 34 is applied through a coupling condenser 61 and the midpoint of load circuit 43, 44 to the cathode of the same diodes, again in push-push relation. Of course, this counterphase signal may, if desired, be taken from the input circuit of triode 25.

In addition to the counterphased signals representing the modulation function of the received carrier, it is necessary to supply a demodulation signal corresponding in frequency and phase to the subcarrier signal conveying the A–B information. The means for applying that demodulation signal is shown in block diagram 65 because the details of that source, of themselves, are of no particular moment to the invention. An illustrative and suitable demodulation signal generator is shown in the above-identified DeVries application. It includes a tuned input selective to the pilot component of the stereophonic program signal which is supplied to the generator through a coupling capacitor 66, coupling the generator to the junction of resistor 20 of the ratio detector and the input terminal of filter 26–30. The tuned input drives a pilot amplifier and the output of the amplifier which is also tuned to the pilot signal component is coupled with a frequency doubler since the specifications of the FCC particularize that the pilot shall be one half the subcarrier frequency. The multiplied signal which corresponds in phase and frequency to the subcarrier is applied to the input circuit of a triode amplifier 67 having an output circuit which is tuned to the demodulation signal. That output circuit is the tuned primary of transformer 42. The cathode of triode 67 is grounded through a self-biasing network comprising a resistor 70 and a capacitor 71.

The synchronous detector comprising diodes 40, 41 performs no detecting function during monophonic reception and the receiver is arranged so that the diodes represent an open circuit during such operating intervals. To that end the junction of load resistors 43, 44 and the cathodes of the diodes are connected to the tap of a voltage divider 68 which extends between a potential source +B and ground. This, of course, is the same potential source that supplies energizing potentials to the various tubes of the receiver. Another substantially unidirectional potential is applied to the opposite side or the anode of the two diodes through a connection extending from the midpoint of the input winding of the detector and through a resistor 59 to a terminal 69 of the demodulation signal generator. Terminal 69 may represent the cathode of the pilot amplifier included in generator 65 which attains a sufficient potential level above ground to apply to the anodes of diodes 40, 41 the same potential as applied to their cathodes from voltage divider 68. This condition exists however only during stereophonic reception because only under that circumstance is the pilot amplifier sufficiently conductive to supply the counter-balancing potential so that there is no effective or net bias across diodes 40, 41. In other words, there is no resultant bias applied to the diodes during stereophonic reception but during monaural operation there is an effective bias applied to the diodes from voltage divider 68 to render the diodes non-conductive.

In considering the operation of the described receiver, it will be assumed that a stereophonic frequency modulation broadcast is being received in the form of a carrier modulated by the modulation function of Equation (1). After amplification and conversion to the intermediate frequency of the receiver, the selected signal is amplitude limited and applied to ratio detector 13 where it is demodulated. The output signal of the ratio detector corresponds to the modulation function of Equation (1). The third term of that equation which represents the pilot is selected by demodulation signal generator 65 and is multiplied in frequency, specifically, it is doubled in order to supply to the synchronous demodulator through amplifier 67 the necessary demodulation signal.

At the same time, the detected signal is applied to amplifier 25 with the protection of the storecasting suppression filter 26–30 which attenuates the storecasting component should it be concurrently received. Counterphased or opposite polarity signals, which individually represent the modulation function of the received carrier, are developed across load impedances 33, 34 of amplifier 25 and are applied to the synchronous detector. The detected signal obtained from anode impedance 33 is larger than that obtained from cathode impedance 34 and the diodes, responding to the detected signal concurrently with the demodulation signal from generator 65 derive the A audio signal at load resistor 44 and the B audio signal at load resistor 43.

As explained in the DeVries application, however, there is a slight amount of each signal contributed to the opposite channel and this is eliminated by matrixing with the counterphased detected signal derived from cathode impedance 34 and applied to the common terminal of load resistors 43, 44. Thus, cleanly separated A and B audio signals are derived from the detector and after amplification in amplifiers 50 and 52 drive speakers 51, 53 to accomplish stereophonic reproduction. During this operation, the counterbalancing potential from terminal 69 of demodulation signal generator 65 permits diodes 40, 41 to accomplish efficient synchronous detection on a 50 percent duty cycle basis.

During the reception of a monophonic signal, no pilot signal component is supplied to generator 65 and there is no counterbalance D.C. potential applied to the anodes of the diodes of the synchronous detector. These diodes are therefore biased to cut-off by voltage divider 68. The signals applied to the detector through input transformer 42 are of no effect and the detected signal delivered from cathode load 34 of amplifier 25 to load resistors 43, 44 is the monophonic audio signal which energizes amplifiers 50–52 and speakers 51–53.

Figure 2A:
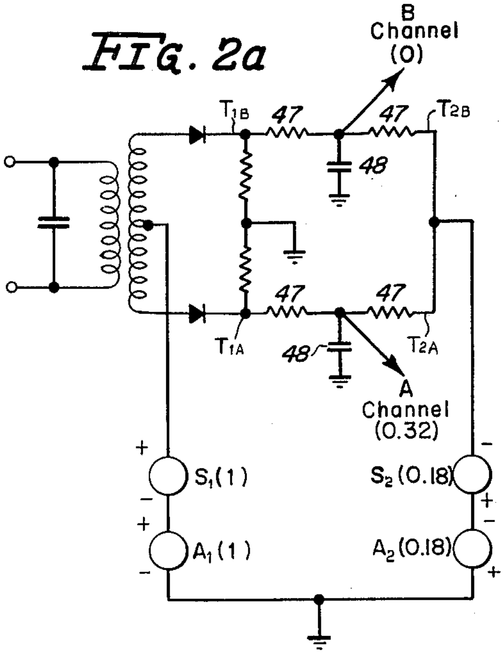
Figure 2B:
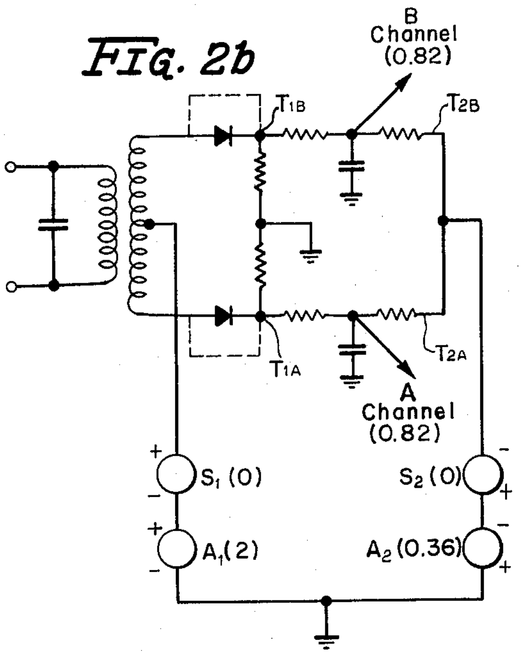

Attention is now directed to the functional views of FIGURES 2*a* and 2*b* in order to understand the requirement for attenuating network 31, 32 in the input to amplifier 25.

These figures represent the synchronous detector of the above-identified DeVries application, showing the significant signal sources and the level of the output for stereophonic and for monaural reception. During stereophonic reception, for example, the principal input signals to the detector are supplied by two pairs of generators designated by circular outline and corresponding to the first two terms of Equation (1); specifically, generator $A_1$ corresponds to the first term while generator $S_1$ represents the second term. The pilot signal component, the third term of the equation, makes no contribution to the detection process other than synchronization and may be neglected. There generators will be considered to be voltage sources of negligible impedance as will be the cases for all four schematic diagrams in FIGURES 2 and 3.

In analyzing the operation of the detector one can assume, for convenience, the special case in which one of the stereo signals is equal to zero. Accordingly, it will be assumed that the peak-to-peak value of the A audio signal is unity while the B audio signal is zero. Consequently one of the generators on the left-hand side of FIGURE 2*a*, representing the first term of Equation (1), is labelled $A_1$ (1). The other generator on the same side of the figure corresponds to the second term of Equation (1) and is the modulated subcarrier which is also assumed to have a unity peak-to-peak value. Hence, it is labelled $S_1$ (1). The signal generators $A_2$ and $S_2$ on the right-hand side of FIGURE 2*a* connect to the diodes through de-emphasis networks individually comprising two equal and series-connected resistors 47' and a shunt capacitor 48. These generators represent the counterphase signal components supplied for matrixing purposes to achieve cleanly separated A and B audio signals and their output levels are less than that of generators $A_1$ and $S_1$. The values 0.18 and 0.18 show the relative magnitude of their contributions to the detector.

The signal intensities associated with the four generators in FIGURE 2*a* are for the special conditions assumed in which case Equation (1) reduces to $$M(t)=A+A \cos \mu_{sc}t \qquad (2)$$

Assigning a unity value to the A audio signal, Equation (2) may be rewritten as follows:

$$M(t)=1+\cos \mu_{sc} \quad (3)$$

If the detector diodes operate at a 50 percent duty cycle, the contributions of the signal generators to the output are obtained by multiplying the terms of Equation (3) with the following function which represents the switching effect:

$$S(f)=\tfrac{1}{2}\pm 2/\pi \cos \mu_{sc}t \quad (4)$$

More specifically, the audio contribution at terminal $T_{1A}$ by generator $A_1$ is ½ and by generator $S_1$ is $1/\pi$ and their total audio contribution is 0.82. The contribution at terminal $T_{1B}$, on the other hand, is $\tfrac{1}{2}-1/\pi$ or 0.18. The contribution of signal generator $A_2$ to terminal $T_{2B}$ is 0.18 but there is no effective contribution by generator $S_2$ because of the by-passing effect of capacitor 48. Consequently, the output for the B channel is zero as indicated. However, generator $A_2$ contributes a signal level of 0.18 to terminal $T_{2A}$ so that the output level of channel A, taking into consideration the signal dividing properties of resistors 47, 47, is 0.32 as indicated. Accordingly, assuming a 50 percent duty cycle for the detector, the output of the B channel is zero while the output of the A channel is equal to 0.32 during stereophonic reproduction.

During monophonic reproduction, the detector operating condition is as indicated at FIGURE 2*b* which shows the output of both signal generators $S_1$ and $S_2$ to be equal to zero. The values of generators $A_1$ and $A_2$, however, are twice the values in FIGURE 2*a*. For the assumed special case of A audio only, the B signal being zero, the stereophonic transmission has two signals of equal peak-to-peak value whereas in monaural there is but a single program signal and if the maximum deviation is to be the same in both cases, the signal amplitude for monaural is doubled as indicated, again ignoring for convenience the pilot signal.

The dotted shunt around the diodes of the detector represents that the diodes are biased to be conductive during monaural reception as explained in the DeVries application.

For this condition, the audio signal contribution to terminal $T_{1B}$ is the same as that for terminal $T_{1A}$; both are equal to 2.0. Similarly, terminals $T_{2A}$ and $T_{2B}$ have identical audio inputs equal to 0.36. Giving consideration to the voltage dividing effect of resistors 47, 47, the outputs of channels A and B for monaural is 0.82. Compared with the output level of 0.32 obtained during stereophonic reproduction, it is clear that a change in level has been experienced with the change in mode from stereophonic to monaural reproduction. The arrangement of the present invention obviates such a change and permits equal output levels to be obtained irrespective of the operating mode.

Figure 3A:
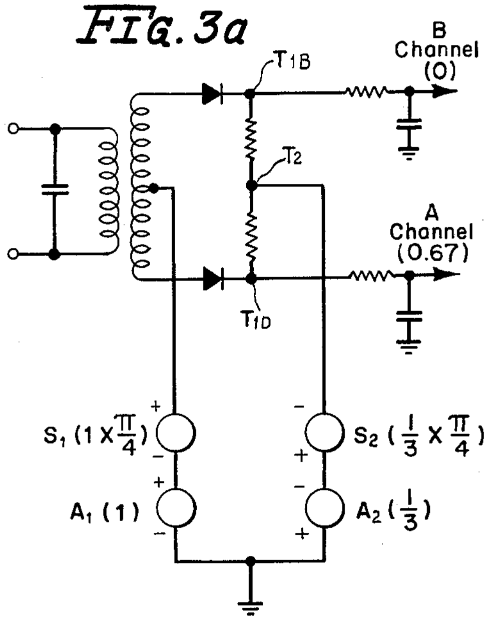
Figure 3B:
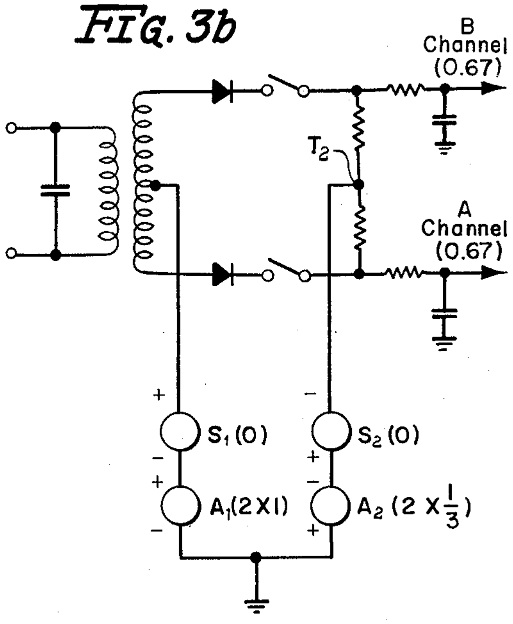

The functional diagrams of FIGURES 3*a* and 3*b* correspond respectively to those of FIGURES 2*a* and 2*b* except that they represent modified signal levels and specific circuit changes which provide the desired result of equal output levels and reduction of the residual background carrier level.

It will be observed, for example, that the right hand signal generators $A_2$ and $S_2$ connect to the junction of the load resistors of the synchronous diodes whereas in the circuit of FIGURE 2*a* these generators connect to the de-emphasis network and, due to the presence of shunt capacitors 48, generator $S_2$ has no significant effect on the operation of the detector circuit. With the modification of FIGURE 3*a* however, the signals from generators $S_1$ and $S_2$ are in push-pull relation across each of the two diodes and aid one another in detection to provide a higher level output.

Another significant circuit change is represented in FIGURE 3*b* by the open switch in series with each of the diodes, indicating that for the monaural condition the diodes are an open circuit. This obtains since in the absence of the pilot component, which is present only during stereophonic reception, there is no counterbalancing potential applied to the diodes from generator 65 and the diodes are therefore biased to represent an open circuit by the connection extending to their cathodes from potential divider 68. This condition is indicated symbolically in the functional diagram of FIGURE 3*b* by open switches although, of course, there are no physical counterparts of these switches actually used; their effect is accomplished through biases.

With these circuit changes and an adjustment in relative intensity of the signals applied to the synchronous demodulator, equal output levels are obtained in both monaural and stereophonic reception. The relative levels are shown by the numerals in parentheses identified with each of the signal generators which may be contrasted with the signal levels represented in FIGURES 2*a* and 2*b*. Specifically, the intensity of the signals from generators $S_1$ and $S_2$ have been changed to $\pi/4$ and $\pi/12$, respectively. It will be recalled that these generators represent the subcarrier signal which is modulated with the difference information of the stereo broadcast. The adjustment in level is attained by a frequency selective means which is responsive predominantly to signals above the audio frequency range. As indicated in FIGURE 1, this means is the attenuator constituted of series resistor 31 and shunt capacitor 32. Additionally, the level of generator $A_2$ has been changed to be ⅓ that of generator $A_1$ and this may be accomplished by adjustment of impedances 33 and 34. If the adjustments make available properly weighted signal levels, weighted in the manner represented in FIGURES 3*a* and 3*b*, the output level of the system is the same irrespective of its operating mode. This is indicated by the levels associated with the A channel in FIGURES 3*a* and 3*b*.

More particularly, the audio contributions of the several signal generators represented in FIGURES 3*a* and 3*b* may be developed in the same way as in the foregoing discussion of the functional views, FIGURES 2*a* and 2*b*. The calculation is simplified somewhat since the signals from subcarrier generators $S_1$ and $S_2$ are in push-pull across each of the diodes of the synchronous detector. Therefore one may combine their outputs so that the effective intensity of the two generators considered together is of a level $\pi/3$. Multiplying this by the operator of Equation 4 shows the audio contribution to be ⅓ which is positive at terminal $T_{1A}$ and negative at terminal $T_{1B}$. The effective audio signal from generators $A_1$ and $A_2$ is ⅔ and a 50 percent duty cycle in the detector results in a contribution from these generators in the amount of ⅓. This contribution cancels that of the subcarrier generators at terminal $T_{1B}$ giving zero output for the B channel but it adds at terminal $T_{1A}$ to provide an output in the amount of 0.67 for the A channel. This, of course, is the condition for stereophonic operation.

For monaural, only the $A_2$ generator is effective and it applies identical outputs to the A and B channels in the amount of 0.67, showing the same level to be obtained for both monophonic and stereophonic modes.

One representative set of circuit parameters for the arrangement of FIGURE 1 from the input of filter 29–30 to the input of amplifiers 50–52 is given below merely by way of illustration and in no sense by way of limitation.

| Resistors: | Values, ohms |
|---|---|
| 30 | 22,000 |
| 31 | 10.000 |
| 33 | 68,000 |
| 34 | 2,200 |
| 43, 44 | 120,000 |
| 45, 47 | 470,000 |
| 59 | 150,000 |
| 68 | 200,000 |
| 70 | 8,200 |

| Capacitors: | | Values |
|---|---|---|
| 27, 46, 48 | micromicrofarads | 150 |
| 28, 29 | do | 180 |
| 32 | do | 220 |
| 66 | do | 120 |
| 60, 61 | microfarads | 0.47 |
| 71 | do | 0.22 |

In explaining the operation of the arrangement of FIGURE 1, it has been stated that the system employs a 50 percent duty cycle in the synchronous detector and also employs the same maximum deviation of the carrier in both monaural and stereophonic transmission. The use of a variable resistor 31 in the attenuator section and variable resistors for the anode or cathode loads of amplifier 25 gives sufficient flexibility to attain the proper weighting of signals for the assumed conditions and for variants in the operating conditions of the system or receiver.

While it is preferred that the synchronous detector operate at a 50 percent duty cycle and weighting of the signals be accomplished by adjustment of the attenuator as explained, similar results may be achieved by omitting attenuator 31, 32 and by modifying the detector efficiency in its detection of the subcarrier component.

The response of the system with change in detector duty cycle is indicated by the characteristic curves of FIGURE 4 in which curve $C_1$ represents detection efficiency relative to the subcarrier signal, curve $C_2$ shows the audio output from the left audio generator $A_2$ in the functional diagrams of FIGURES 3*a* and 3*b* while curve $C_3$ indicates the output from the right audio signal generator $A_1$. Maximum detector efficiency for the subcarrier is realized at 50 percent duty cycle and the efficiency drops symmetrically from this maximum as the duty cycle is changed above or below the 50 percent value. For the condition of 100 percent duty cycle in which diodes 40–41 are continuously conductive, there is no detection of the subcarrier and the audio signal from generator $A_1$ gives the total net audio output since it is larger in value than the signal from audio generator $A_2$. At the opposite extreme of zero cycle duty, there is again no detection of the subcarrier and there is no contribution from audio generator $A_1$ since both diodes are on open circuit. Accordingly, the total audio output is the contribution from audio generator $A_2$. Intermediate values of duty cycle experience contributions of varying amounts from the four signal generators, the two subcarrier generators $S_1$ and $S_2$ and the two audio generators $A_1$ and $A_2$. Therefore the desired weighting of the signal components may be accomplished by variation in duty cycle of the synchronous detector.

Adjustment of duty cycle as a practical matter is easily accomplished by means of voltage divider 68 which adjusts the amplitude of bias applied to the cathodes of diodes 40–41. For a condition of 50 percent duty cycle, this bias is equal to the potential applied to the anodes of the two diodes from generator 65 and other values of duty cycle result where these biases are made unequal.

Of course, the efficiency of a synchronous detector may also be varied by changing the phase of the demodulation signal. When that signal is in phase with the subcarrier, maximum efficiency results and the efficiency drops to zero as the phase of these signals is modified to approach a quadrature phase condition. Phase control of the demodulation signal is a simple matter, requiring only a phase-shifting network in the demodulation signal channel.

Instead of attenuating the subcarrier component through attenuator 31, 32 of FIGURE 1, the desired result of equal output for monaural and stereophonic operation may be achieved in yet a further manner, as represented in FIGURE 5 where a coupling capacitor 80 is to be supplied from the output of the background or SCA filter 26–30 of FIGURE 1. The coupling capacitor connects to the synchronous detector through a pre-emphasis network comprising a variable resistor 81 shunted by a capacitor 82.

An important difference of this circuit from that of FIGURE 1 is that the arrangement of FIGURE 5 does not require counterphased signals for matrixing. It is explained in the above-identified Adler et al. application that operation on the signal output of the ratio detector by a demodulation signal of appropriate waveform and amplitude may accomplish clean separation of the A and B audio signals directly without any requirement of matrixing and this is the principle upon which the arrangement of FIGURE 5 functions. It will be observed, however, that there is a voltage dividing network and a third diode in the arrangement of FIGURE 5 which is not found in the previously described receivers.

The voltage divider is comprised of two parallel branches, one having series-connected resistors 83 and 84 and the other having series-connected resistors 85, 86 and 87. This network is connected across a potential source indicated +B. An auxiliary diode 88 is connected between the common junction of resistors 86 and 87 and diode load resistors 43, 44.

The legend at the top of the figure reading, "To Demodulation Signal Generator" indicates the connections through which the demodulation signal, appropriately synchronized and phased relative to the subcarrier component, is applied to the synchronous detector. The third connection of this group, extending through resistor 59, represents a D.C. bias supply for the detector obtained from the demodulation signal generator so that its value varies as between stereophonic and monophonic modes.

During stereophonic reception the potential applied through resistor 59 to the anodes of diodes 40, 41 is essentially the same as the D.C. potential applied to their cathodes from network 83, 84. Consequently, the diodes have no net bias and they respond to the audio and subcarrier components of the output signal of ratio detector 13 to derive the A and B stereophonic signal components. It may be shown that adjustment of network 81, 82 to exalt the subcarrier component a suitable amount permits clean separation of the A and B audio signals in the detection process.

During stereophonic operation, auxiliary diode 88 is biased to cut off by virtue of the larger potential applied to its cathode from resistor 59 than is applied to its anode from the junction between resistors 86–87. It has no role during stereophonic reception.

In monophonic reproduction, the potential applied from resistor 59 to the synchronous diodes is less than that applied from network 83, 84 which biases the diodes to cut off. They consequently serve no purpose during monaural reproduction. The audio signal output of the ratio detector is divided by resistive network 86, 87 and is delivered through auxiliary diode 88 to the A and B amplifiers through resistors 43, 44. This is achieved by virtue of the fact that the bias conditions for the monophonic mode cause diode 88 to be conductive, serving as a low-resistive impedance. This bias condition again results from the fact that the potential delivered from resistor 59 during the monaural mode is less than that which is supplied to the diode from resistive network 85–87. Appropriate adjustment of resistors 59, 86 and 87 permits the output level in both operating modes to be maintained essentially constant.

Accordingly, this arrangement may be utilized to practice the invention but it is not a preferred form if the receiver is in an area where auxiliary services, such as storecasting, are also encountered because network 81, 82 empasizes all signal frequencies above the audio range and would therefore emphasize any residual background carrier that might be delivered through coupling condenser 80. Where more complete freedom from such background carriers is required, without any sacrifice in the quality of the monaural or stereophonic reproduction, the arrangement of FIGURE 1 is preferred.

Purely by way of illustration, and not in any sense limitation, a suitable set of parameters, for the arrangement of FIGURE 5 is given in the following table:

| | | |
|---|---|---|
| Resistors: | | |
| **43, 44, 83** | ohms | 470,000 |
| **45, 47** | megohms | 2.2 |
| **59** | ohms | 2200 |
| **81** | do | 120,000 |
| **84** | do | 56,000 |
| **85** | do | 220,000 |
| **86** | do | 12,000 |
| **87** | do | 22,000 |
| Capacitors: | | |
| **46, 48** | micromicrofarads | 39 |
| **80** | microfarads | 0.22 |
| **82** | micromicrofarads | 100 |
| Source +B—200 volts. | | |

Viewed as a method, the invention contemplates demodulating the carrier signal to derive a detected signal which represents the modulation function of the received carrier. The audio components of the detected signal are translated to a sound reproducer during monaural operation. This detected signal is further demodulated to derive separated A and B audio signals during stereophonic reception. Additionally, the method contemplates adjusting the intensity of the signal taken from the first signal detector in response to a change between monaural and stereophonic reproduction to maintain the level of reproduction approximately constant in both modes of operation.

The described arrangement has the advantage of constant output level whether it operates in the stereophonic or monophonic mode plus the desirable attribute of changing between these modes in accordance with the character of the received signal. The modified synchronous demodulator yields a higher output because of the push-pull effect of the subcarrier as applied to the diodes. Also, there is improved rejection of the storecasting subcarrier by means of filter 26–30 and attenuator 31, 32 and structurally, the receiver is quite simple. Various ways of practicing the invention have been described and they may be used alone or in combination.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, a receiver comprising: means for demodulating said carrier signal to derive a detected signal representing the modulation function of said carrier; means for applying said detected signal to a second demodulator which translates audio without detection during monaural operation but which derives separated A and B audio signals during stereophonic reception; and electrical circuit means for effectively adjusting the intensity of the signals applied to said second demodulator in response to a change between monaural and stereophonic reproduction to maintain the level of reproduction approximately constant during monaural and stereophonic reproduction.

2. In a monaural-stereophonic frequency modulation system for using a carrier signal frequency modulated by monaural information or frequency modulated by stereophonic information represented by the modulation function $$M(t)=K_1(A+B)+K_2(A-B)S$$

Where A and B are audio signals, S is an amplitude-modulated subcarrier signal, and $K_1$ and $K_2$ are constants, a receiver comprising: means for demodulating said carrier signal to derive a detected signal representing the modulation function of said carrier; means coupled to said demodulating means, including a second demodulator, for translating the audio components of said detected signal during monaural operation and for deriving separated A and B audio signals during stereophonic operation; and electrical circuit means including a phase splitting amplifier for weighting the intensity of said detected signal as applied to said second demodulator in response to a change between monaural and stereophonic reproduction to maintain the level of reproduction approximately constant during monaural and stereophonic reproduction.

3. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, a receiver comprising: means for demodulating said carrier signal to derive a detected signal representing the modulation means, including a second demodulator, for translating the audio components of said detected signal during monaural operation and for deriving separated A and B audio signals during stereophonic operation; and frequency-selective signal-translating means predominantly responsive to signal components above the audio range for adjusting the intensity of said detected signal as applied to said second demodulator in response to a change between monaural and stereophonic reproduction to maintain the level of reproduction approximately constant during monaural and stereophonic reproduction.

4. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, a receiver comprising: means for demodulating said carrier signal to derive a detected signal representing the modulation function of said carrier; means coupled to said demodulating means, including a second demodulator, for translating the audio components of said detected signal during monaural operation and for deriving separated A and B audio signals during stereophonic operation; and frequency-selective signal-translating means including an attenuator, said signal-translating means being predominantly responsive to signal components above the audio range for adjusting the intensity of said detected signal as applied to said second demodulator in response to a change between monaural and stereophonic reproduction to maintain the level of reproduction approximately constant during monaural and stereophonic reproduction.

5. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, a receiver comprising: means for demodulating said carrier signal to derive a detected signal representing the modulation function of said carrier; a synchronous detector including a pair of diodes interconnecting an input circuit and an output circuit; means for applying a demodulation signal, related in frequency and phase to said subcarrier signal, to said input circuit in push-pull relation to said diodes; means for deriving a pair of counterphased signals individually representing said detected signal and for applying one to said diodes in push-push relation through said input while applying the other to said diodes in push-push relation through said output; and means for adjusting the intensity of said detected signals as applied to said synchronous detector in response to a change between monaural and stereophonic reproduction to maintain the level of reproduction approximately constant during monaural and stereophonic reproduction.

6. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, a receiver comprising: means for demodulating said carrier signal to derive a detected signal representing the modulation function of said carrier; a synchronous detector including a pair of diodes interconnecting an input circuit and an output circuit; means for applying a demodulation signal, related in frequency and phase to said subcarrier signal, to said input circuit in push-pull relation to said diodes; means for deriving a pair of counterphased signals individually representing said detected signal and for applying one to said diodes in push-push relation through said input while applying the other to said diodes in push-push relation through said output; means effective only during intervals of monaural operation for rendering both of said diodes nonconductive; means for adjusting the intensity of said detected signals as applied to said synchronous detector in response to a change between monaural and stereophonic reproduction to maintain the level of reproduction approximately constant during monaural and stereophonic reproduction; and means coupled to said output circuit of said synchronous detector for deriving an output signal for reproduction.

7. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, a receiver comprising: means for demodulating said carrier signal to derive a detected signal representing the modulation function of said carrier; a synchronous detector including a pair of diodes interconnecting an input circuit and an output circuit; means for applying a demodulation signal, related in frequency and phase to said subcarrier signal, to said input circuit in push-pull relation to said diodes; an amplifier having a balanced output circuit and coupled to said demodulating means for deriving a pair of counterphased signals individually representing said detected signal and for applying one to said diodes in push-push relation through said input while applying the other to said diodes in push-push relation through said output; and means for adjusting the intensity of said detected signals as applied to said synchronous detector in response to a change between monaural and stereophonic reproduction to maintain the level of reproduction approximately constant during monaural and stereophonic reproduction.

8. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, the method of receiving which comprises: demodulating said carrier signal to derive a detected signal representing the modulation function of said carrier; translating the audio components of said detected signal to a sound reproducer during monaural operation; further demodulating said detected signal to derive separated A and B audio signals during stereophonic reception; and effectively adjusting the intensity of said detected signal in response to a change between monaural and stereophonic reproduction to maintain the level of reproduction approximately constant during monaural and stereophonic reproduction.

9. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, the method of receiving which comprises: demodulating said carrier signal to derive a pair of counterphased signals individually representing the modulation function of said carrier; reproducing one of said pair of signals during monaural reproduction; detecting said pair of signals to derive and reproduce separated A and B audio signals during stereophonic reception; and adjusting the detection efficiency in respect of said pair of signals to maintain the level of reproduction approximately constant during monaural and stereophonic reproduction.

10. In a monaural-stereophonic frequency modulation system for using a carrier signal frequency modulated by monaural information or frequency modulated by stereophonic information reresented by the modulation function $$M(t)=K_1(A+B)+K_2(A-B)S$$

where A and B are audio signals, S is an amplitude-modulated subcarrier signal, and $K_1$ and $K_2$ are constants, a receiver comprising: means for demodulating said carrier signal to derive a detected signal representing the modulation function of said carrier; a subcarrier detector circuit, coupled to said demodulating means and operative only during intervals of stereophonic signal reception, and including a pair of diodes and a pair of load resistors for deriving substantially separated A and B audio signals of a predetermined intensity respectively across said load resistors during said intervals; and a signal translating network coupled to said demodulating means and effective only during monaural operation for developing a monaural signal across each of said load resistors of an intensity approximately equal to said predetermined intensity.

11. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, a receiver comprising: means for demodulating said carrier signal to derive a detected signal representing the modulation function of said carrier; a synchronous detector including a pair of diodes, an input circuit and an output circuit, said output circuit including a pair of load resistors connected in series between said diodes; means for applying a demodulation signal, related in frequency and phase to said subcarrier signal, to said input circuit; means for applying said stereo information concurrently with said demodulation signal to said detector to develop separated A and B audio signals of a predetermined intensity respectively across said load resistors; means for biasing said diodes to prevent signal translation therethrough during monaural reception and for removing said bias during stereophonic reception; and a signal-translating network coupled to said demodulating means and effective only during monaural reception for developing a monaural signal across each of said load resistors of an intensity approximately equal to said predetermined intensity.

12. In a monaural-stereophonic frequency modulation system for using a carrier signal frequency modulated by monaural information or frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, a receiver comprising: means for demodulating said carrier signal to derive a detected signal representing the modulation function of said carrier; a synchronous detector including a pair of diodes connected between an input circuit and an output circuit, said output circuit including a pair of load resistors; means for applying a demodulation signal, related in frequency and phase to said subcarrier signal, to said input circuit for application in push-pull relation to said diodes; a first signal supply means coupled to said demodulating means for applying said detected signal to said diodes in push-push relation during stereophonic reception to develop said A audio signal and a predetermined small unwanted contribution of said B audio signal across one of said load resistors and to develop said B audio signal and a predetermined small unwanted contribution of said A audio signal across the other of said load resistors; means including a pre-emphasis network coupled between said demodulating means and said synchronous detector for selectively emphasizing said amplitude modulated subcarrier components with respect to said audio components prior to the application of said stereo information to said detector to develop substantially said A audio signal in said one load circuit and substantially said B audio signal in said other load circuit; means for biasing said diodes to cut-off during monaural reception and for removing said bias during stereophonic reception; a second signal supply means coupled to said demodulating means for applying said detected signal to said output circuit; and means for interrupting said second signal supply means during stereophonic reception and for enabling it during monaural reception.

References Cited by the Examiner

FOREIGN PATENTS 540,185 10/1941 Great Britain.

DAVID G. REDINBAUGH, *Primary Examiner.*

ROBERT L. GRIFFIN, *Assistant Examiner.*